United States Patent Office 3,210,443
Patented Oct. 5, 1965

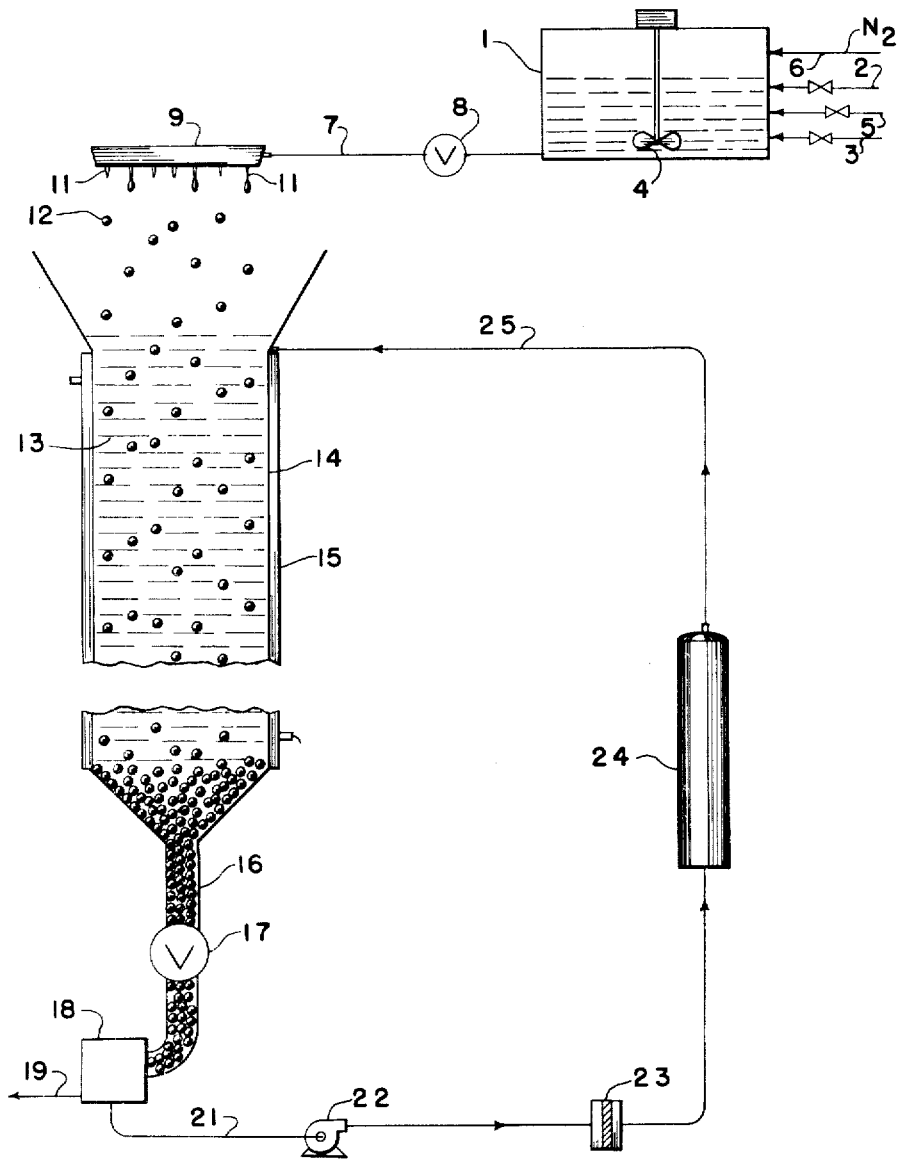

3,210,443
PROCESS FOR PRODUCING POLYESTER
PLASTIC SPHERES
William A. Reddie and Gerald D. Ogden, Houston, and Thomas E. Sample, Jr., Austin, Tex., assignors to Magnet Cove Barium Corporation, a corporation of Arkansas
Filed Nov. 14, 1963, Ser. No. 323,644
12 Claims. (Cl. 264—14)

This invention relates to the art of producing small solid spheres of plastic materials. It is particularly directed to a process for producing substantially perfect spheres of thermoset polyester plastics.

Small plastic spheres of equal size have a great many uses as, for example, in insulation where the relatively large body of quiescent air trapped between small spheres of uniform size effectively minimizes heat transfer through the mass, and such balls have been suggested as friction-reducing bearings in applications where the load is not too great. Another common use is as fracture propping agents in fracturing underground formations adjacent to oil or gas wells to increase the production of petroleum materials.

In the fracturing process, a fluid is pumped into a well bore penetrating a producing formation under very high pressure so that the fluid from the well flows into the sandstone of the formation and splits or cracks the formation in a manner to increase the exposed surface from which the oil or gas is produced. A propping agent is disposed in the fracture while it is open to prevent the fracture from closing when the high pressure is released.

Plastic balls made of styrene-divinylbenzene cross-linked resin manufactured by a "suspension polymerization" process have been suggested as fracture propping agents and these materials are satisfactory in most cases. Resins of thermosetting type however have been made into spherical form in the past entirely by suspension polymerization. This process, as is shown in U.S. Patents 2,610,170, 2,610,171 and 2,652,386, comprises dispersing a liquid thermosetting prepolymer in a liquid heat-transfer medium maintained at a temperature sufficiently high to cure the pre-plastic material, and maintaining the pre-plastic material in suspension by agitation and rapid circulation of the hot heat-transfer medium to prevent settling of the pre-plastic until the desired degree of polymerization is attained.

This process results in the formation of droplets of liquid pre-plastic of a wide range of sizes in the liquid heat-tranfer agent. During the time the droplets are suspended for curing, which may be five minutes or more, the degree of agitation necessary to keep the droplets in suspension causes some of the droplets to be broken up into still finer ones, and results in other suspended droplets coming into contact with each other and coalescing to form larger ones. The size of the cured plastic spheres varies so greatly from sphere to sphere that it is impractical to produce spheres that are substantially uniform in size. It is customary to screen out spheres that are within a desired size range, such as 20 to 40 mesh and to use a product of such mixed sizes. U.S. Patent 3,089,542 teaches the use of spheres of different diameters within a selected size range as propping agents in fracturing formations for the production of oil and gas. Spheres of substantially uniform size will form a bed having a greater volume of voids and hence more permeable than a bed formed from spheres of mixed sizes.

A large proportion of undersize and oversize particles outside of a desired size range are produced by the suspension polymerization process, together with spheres of different diameters within the desired size range; and on screening out the undersize and oversize particles there is a considerable waste of material.

It is an object of the present invention to provide a process for the production of substantially perfect, solid spheres of thermoset polyester plastic in which the spheres are substantially uniform in size and waste due to production of undersize and oversize particles is minimized.

Another object is to provide a process of the above type in which spheres of a liquid thermosetting pre-plastic are initially set and cured while drifting slowly downward through a substantially quiescent liquid heat-transfer medium.

Another object is to provide such process in which contact of the spheres with each other or with apparatus, while in soft or sticky condition, is avoided.

Another object is to provide a process of the above type which results in strong, resilient spheres unaffected by salt water and oil and suitable for use as fracture propping agents.

Other objects, advantages and features of this invention will be apparent to one skilled in the art upon a consideration of the written specification, the attached claims and the annexed drawing.

The term "polyester pre-plastic" is used in this specification and claims to mean a solution or suspension of an unsaturated polyester of a dihydric alcohol and dibasic organic acid in a monomer having a vinyl linkage reactive with the polyester at elevated temperatures to form a thermoset plastic. Unsaturation is introduced into the polyester by use of an unsaturated dibasic organic acid in its preparation as, for example, fumaric acid, maleic or phthalic acids or their anhydrides, or mixtures thereof. A minor amount of a saturated dibasic acid, such as adipic acid, often is included in the acid mixture. Ethylene glycol, diethylene glycol, propylene glycol, or the like, or a mixture thereof, usually is used as the dihydric alcohol. These polyesters are known to be of linear structure with recurring double bonds.

It is common commercial practice to carry out the polyesterification reaction with substantially stoichiometric proportions of dibasic acids and dihydric alcohols and to continue the reaction until the product has an acid number in the range from about 10 to 50. The resulting polyester resin usually is solid but is soluble or suspendable in a monomer having a vinyl linkage. Styrene, vinyl toluene, divinylbenzene, methylstyrene, methylmethacrylate, and diallyl phthalate are the most commonly used monomers. The monomer is usually present in the polyester pre-plastic to an extent of about 20 to 50 percent by weight.

Since such polyester pre-plastics are common articles of commerce and are readily available from a large number of manufacturers and the present invention is not limited to any particular polyester pre-plastic, it is not believed necessary to describe the starting materials in greater detail.

In the present process substantially uniform spheroidal drops of a free-flowing liquid polyester pre-plastic are extruded from a nozzle, preferably a nozzle having multiple uniform orifices laterally spaced from each other to fall downward through a gas, preferably air, into a body of a hot liquid inert to and immiscible with the drops and having high heat-transfer characteristics.

The size of the orifice or multiple uniform orifices is selected so that the extruded spheroidal drops are uniform in size and have a volume substantially equivalent to a sphere having a selected diameter in the range from 0.09 to 0.25 inch. Commercial hypodermic needles cut off at a right angle to their axes may be used as dropping orifices if desired and have been found to result in drops of the following average sizes, according to needle gauge.

| Needle gauge: | Average diameter of sphere, inches |
|---|---|
| 20 | 0.0910 |
| 18 | 0.0995 |
| 16 | 0.1180 |
| 13 | 0.1304 |

It is preferred that the free-flowing, pre-plastic mixture be extruded at a rate of about one drop per second from each orifice to secure best uniformity in size.

The distance that the spheroidal drops fall freely through the gas is selected so that it provides time for the drops to acquire substantially spherical shape before contact with the hot heat-transfer liquid, and insufficient for the drops to acquire sufficient velocity to break them up into finer particles by impact upon the surface of the liquid. This distance will usually be in the range from one to four feet. The liquid heat-transfer medium is maintained at sufficiently elevated temperature to cure the polyester preplastic material in the drops. It is not necessary that the temperature be uniform throughout, in fact convenience in heating is best obtained by maintaining a heat gradient between top and bottom of the liquid. Temperatures within this gradient are maintained below the boiling point of the lowest boiling material in the particular polyester pre-plastic used and above the melting point of the highest melting material therein. It is preferred that this gradient be entirely within the range from about 200° F. to about 300° F., since temperatures below 200° F. increase the time required for initial cure and top temperatures above 300° F. are unnecessary, even when such high boiling monomers as divinyl benzene or diallyl phthalate are used.

The liquid heat-transfer medium is selected so that it not only has high heat-transfer properties but is inert toward the falling drops and is immiscible therewith. After contact with the hot liquid heat-transfer medium, the drops are passed slowly downward by gravity through the liquid heat-transfer medium in free-falling relationship therewith, for a time sufficient for initial cure of the polyester pre-plastic, and cure of the spherical drops preferably is completed in a lower part of the heat-transfer medium although the initially cured spheres may be withdrawn from the liquid heat-transfer medium and curing completed elsewhere, if desired.

The commercial polyester pre-plastics available on the market often are too viscous for extrusion of the material in drops of the required size at practical rates, and in this case we prefer to dilute the pre-plastic material with additional monomer. The monomer used for dilution to form a free-flowing liquid may be the same monomer which is present in the commercial polyester pre-plastic or any of the other effective monomers may be used for dilution purposes. Styrene is a preferred monomer for dilution when cheapness is the principal characteristic required in the final product, and diallyl phthalate is preferred when highest strength is required. Any of the other monomers mentioned above may be used or mixtures thereof; but in any case when viscosity of the commercial material is too high, sufficient monomer is mixed with the commercial polyester pre-plastic to convert it to a free-flowing liquid.

A curing catalyst, such as benzyl chloride, aniline hydrochloride, hydroxylammonium acid sulfate or benzoyl peroxide, should also be mixed with the free-flowing polyester pre-plastic in quantity sufficient to substantially increase the rate at which the mixture reacts at a given temperature. Benzoyl peroxide is the preferred catalyst for this use. Benzoyl peroxide is sold commercially in the form of a paste containing 50 percent active material, and this commercial paste gives good result when mixed with the polyester pre-plastic. This 50 percent paste of benzoyl peroxide in tricresylphosphate may be mixed with the pre-polymer in proportions in the range from 2 to 8 percent by weight, or preferably about 4 percent, thus supplying a benzoyl peroxide content in the pre-plastic material of from 1 to 4 percent, with the preferred content being about 2 percent.

The liquid heat-transfer medium may be any liquid which is inert toward the pre-polymer and immiscible therewith and which has high heat-transfer characteristics accompanied by specific gravity and viscosity such that the drops pass slowly downward through the heat-transfer medium.

It is desirable that the liquid heat-transfer medium have a high flash point, high boiling point, low vapor pressure and have no adverse chemical reactivity with the pre-plastic during the cure. It is further preferred that the heat-transfer medium be non-toxic, non-flammable and non-foaming. The viscosity of this medium is preferably in the range between 5 and 30 cps. at 175° F. The medium preferably should be transparent or translucent so that falling drops can be observed by an operator as they drift slowly down through the heat-transfer medium and it must have a density less than the density of the cured polyester plastic.

One preferred liquid heat-transfer medium is a mixture of ethylene glycol and glycerol in proportions in the range from 3 to 5 parts by volume of ethylene glycol to 1 part of glycerol. Mixtures of this type are preferred because they have the required properties set forth above as desirable in a liquid heat-transfer medium and have the proper relationship of specific gravity to specific gravity of the extruded drops. Proportions outside these ranges of ethylene glycol to glycerol may be used in the rare cases where the specific gravity of the cured spheres is less than that of the mixtures in the proportions stated above. The particular mixtures in which ethylene glycol is in the range from 3 to 5 parts by volume to 1 part of glycerol have specific gravities in the range from about 1.137 to about 1.141, at room temperature.

We have also found that a mineral oil liquid heat-transfer agent containing about 3 percent of a colloidal dispersion of a reaction product of dimethyldioctadecyl-ammonium halide and a magnesium montmorillonite is an excellent liquid heat-transfer medium although it has a specific gravity of about 0.85 at 200° F. depending upon the specific gravity of the oil prior to the addition of the clay compound and the exact quantity of clay compound added. Other viscosity-increasing materials also may be blended with mineral oil in order to raise the viscosity thereof and the resulting mixtures used as heat-transfer media. The organophyllic clay complexes made by reacting a long alkyl chain quaternary ammonium halide with a clay are preferred viscosity-increasing materials when mineral oil is used. Although there is a large difference between the specific gravities of the oil mixture and the extruded drops, the drops will drift slowly downward through the medium at the preferred rate of travel due to the high viscosity of these mixtures. A viscosity of about 12 to 16 cps. is preferred.

The rate of travel of a particular size drop downward through the liquid heat-transfer medium may be controlled either by selecting a heat-transfer medium having a specific gravity in such relationship with the specific gravity of the drops that the proper rate of travel is obtained, or by selecting a viscosity for the heat-transfer medium such that the drops pass downward therethrough at a slow rate. It is preferred that the rate of travel of the drops downward through the heat-transfer medium require about 2½ to 10 seconds per linear foot of travel.

The depth of the body of liquid heat-transfer medium is selected so that the drops will move slowly downward through the substantially quiescent medium without contact with each other or with any apparatus used until initial cure has occurred and the spheres are no longer in soft and sticky condition. The time required for initial cure is about 20 to 40 seconds. Since additional curing during passing of the drops downward through the liquid is not deleterious, it is preferred that the depth of the body of liquid heat-transfer media be selected in the range from about 10 to 20 feet than in the range from 2 to 16 feet required to provide travel time for initial cure at the above rates of descent.

A body of liquid heat-transfer medium of this depth provides sufficient volume in the bottom thereof for retaining initially cured spheres for a time sufficient to complete the cure. We have found that spheres of the sizes described are completely cured in a time in the range from 5 to 10 minutes. Cured in this manner, the spheres are clear and free from cracks, checks or internal strains which substantially reduce their compressive strength.

The liquid heat-transfer medium is maintained at temperatures below the boiling point of the lowest boiling material, usually the monomer, in the polyester pre-plastic therein, preferably temperatures in the range from about 200° F. to 300° F., preferably 200° F. to 275° F. Normally there will be a heat gradient between the top and bottom of the body of heat-transfer media, and this range will include a bottom temperature in the neighborhood of 200° F. and a top temperature in the range from 225° F. to 300° F. We have found that, if the top temperature is less than 225° F., the extruded drops falling upon the surface of the liquid tend to be badly deformed and are broken by impact and an excess amount of fine material is formed. We have found that best results in elimination of fine material is usually attained at about 245° F. and a top temperature near this value is preferred, accompanied by a bottom temperature of about 210° F.

It is preferred that the spheres be retained in the bottom of the heat transfer media until complete cure is accomplished. This, however, is not necessary; but after the initial cure, the spheres are in sufficiently hardened condition that they will not be deformed by careful handling; and, if desired, they can be withdrawn and the cure completed in auxiliary apparatus. However, this complicates the process and ordinarily is not advantageous and so is a less preferred procedure.

After curing the spheres may be washed free of any excess liquid heat-transfer medium, are dried and are ready for use. When ethylene glycol-glycerol is used as the heat-transfer medium, the spheres may be washed with water; or when a mineral oil thickened with a hydrophyllic clay complex is used, a solvent such as acetone is used for washing. By proper control of the critical variables set forth above, a yield of closely sized substantially spherical pellets amounting to more than 95% of the weight of resin consumed may be obtained.

The attached drawing illustrates diagrammatically one system of apparatus which may be used in carrying out the process of this invention. In the single figure, the reference numeral 1 designates a mixing tank into which a commercial polyester pre-polymer is introduced from a source (not shown) through line 2 and a monomer such as styrene or diallyl phthalate, if required, is introduced through line 3 in quantity sufficient to dilute a viscous polyester pre-plastic to convert it into a free-flowing liquid. Tank 1 preferably is equipped with a motor driven agitator 4. Benzoyl peroxide in the range from about 1 to 4 percent of the total polyester pre-plastic mixture is supplied by line 5, and the ingredients introduced into tank 1 are thoroughly mixed by operation of the agitator 4.

An inert gas, such as nitrogen, under pressure in the range from about 3 to 15 p.s.i.g. is introduced from a source (not shown) at 6 so that pressure upon the surface of the liquid in tank 1 is maintained without unnecessary exposure to oxygen from the air which might tend to cause curing to begin while the mixture is still in tank 1.

The thinned polyester pre-plastic is passed under pressure from the inert gas in tank 1 through line 7, having a valve 8, into extrusion head 9, and preferably having a plurality of uniform orifices illustrated as provided by cut-off hypodermic needles 11. The orifices 11 are of uniform size and the rate of flow of the polyester pre-plastic is controlled so that spheroidal drops of this material are extruded from each of the orifices 11 at a rate of about 1 drop per second.

The extruded drops 12 then fall freely through gas, preferably air, for a distance sufficient for them to acquire substantially spherical form and preferably in the range from about 1 to 4 feet. The falling drops 12 fall into a liquid heat transfer medium in a vertical column designated generally as 14. This liquid heat transfer medium is preferably a material selected from the group consisting of mixtures of ethylene glycol and glycerol, and mixtures of mineral oil and a reaction product of a long alkyl chain quaternary ammonium halide and a clay. The liquid heat-transfer medium is maintained at temperatures in the range from 200° F. to 300° F. by any suitable heating means, illustrated as a steam jacket 15, so there is a heat gradient in the substantially quiescent liquid 13 from a cooler temperature at the bottom of column 14 to a temperature in the range from 225° F. to 300° F. at the upper surface of liquid 13; and preferably the upper part of liquid 13 is maintained at a temperature of about 245° F.

The drops 12 fall upon the surface of liquid 13 and sink slowly downward therethrough at a rate of about 2½ to 10 seconds per foot of linear travel determined by the viscosity and specific gravity of liquid 13. The height of column 14 is selected to provide sufficient distance for the drops to sink slowly through liquid 13 at this rate for a time in the range from about 20 to 40 seconds or more. During their passage downward through the heat-transfer medium, the droplets complete their initial cure and the resulting spheres of polyester plastic accumulate in the lower part of column 14 and are there retained for sufficient time to complete their cure. The total curing time required is ordinarily in the range from 5 to 10 minutes.

After the spheres have been completely cured, they are withdrawn from column 14 by line 16 containing valve 17 and are passed to a centrifuge 18 where liquid heat-transfer medium withdrawn with the spheres is separated from them. The spheres are then passed as indicated by the arrow 19 to any suitable washing and drying steps desired. The separated liquid heat-transfer medium is then withdrawn by line 21 and pump 22 and passed through a filter 23 to remove any detritus that may have been formed. The filtered heat-transfer medium is then passed to a heater 24 and is recycled through line 25 to an upper part of column 14.

The following examples illustrate the results obtained in forming substantially perfect polyester plastic spheres from readily available commercial polyester pre-plastic materials.

EXAMPLE I

A large number of commercially available polyester pre-plastic materials were formed into spheres by the following procedure.

A mixture of benzoyl peroxide and the polyester pre-plastic was prepared by adding benzoyl peroxide paste in quantities ranging from 2 to 8 percent of the commercial polyester pre-plastic material, diluted with monomer if required and mixing thoroughly with a Hamilton Beach mixer. After the peroxide paste was thoroughly dispersed in the resin, the mixture was introduced into a dropping head having a plurality of uniform orifices formed from cut-off hypodermic needles. Gas pressure in the range from 3 to 15 p.s.i.g. was applied to the mixture with the result that drops were extruded from each of the orifices at an approximate rate of 1 drop per second. The gas used as pressure medium was nitrogen.

The drops then fell through air into a column of hot heat-transfer liquid where they were cured. The distance from the dropping head to the surface of the heat-transfer liquid was selected so that it provided a falling time in air sufficient for the spheroidal extruded drops to become substantially spherical. The selection was made by moving the dropping head vertically up and down to a distance required by the particular polyester pre-plastic material being tested. This distance was found to vary according to the composition of the polyester pre-plastic but was in the range from 1 to 4 feet. It was found that too great a distance resulted in the drops acquiring sufficient velocity that they became deformed or shattered on impact with the surface of the heat-transfer medium.

The heat-transfer liquid used in this series of tests was a mixture of ethylene glycol and glycerol having its specific gravity adjusted to a value slightly below the spcific gravity of the extruded drops. For increasing the specific gravity when necessary, additional glycerol was added to the mixture; and when it was necessary to decrease the specific gravity, a larger quantity of ethylene glycol was blended into the mixture.

The drops were passed slowly downward to provide time for initial cure before the drops came to rest at the bottom of the column of heat-transfer liquid. Initial cure was such that the drops were no longer in soft and sticky condition, and had sufficient rigidity that they were not deformed by weight of overlying drops when a pile of initially cured drops accumulated in the lower part of the column. It was found that a falling time through the heat-transfer liquid in the range from about 20 to 40 seconds was sufficient for such initial cure and that the time required varied somewhat with the composition of the polyester pre-plastic.

After the spheres reached the bottom of the column of heat-transfer liquid, they were held for additional time to provide a total of 5 to 10 minutes for complete cure.

The heat-transfer liquid was heated by winding a Pyrex glass tube in which the liquid was contained with one-inch electric heating tape. It was found that the tube easily transmitted heat to the liquid contained therein at a rate sufficient to maintain the liquid in the range from 200° F. to 300° F. It was found that a temperature of the heat-transfer liquid at the surface thereof when maintained at about 245° F. resulted in maximum decrease in the number of falling drops shattered or broken up by impact with the surface of the liquid. After complete cure, the spheres were removed from the heat-transfer medium and washed with water and dried.

The dried spheres were subjected to compressive strength tests and were examined for freedom from checks, cracks and internal strains. All were substantially clear and free from internal strains, checks and cracks and had good compressive strength at room temperature. The materials tested and the compressive strength of spheres having an average diameter of 0.1304 inch were as follows:

Table 1
COMPARISON OF PHYSICAL CHARACTERISTICS OF VARIOUS PLASTIC BEADS

| Polyester Pre-Plastic | Manufacturer | Compressive Strength of Individual Bead at Room Temperature (Pounds) |
|---|---|---|
| 80% Altek 4<br>10% Polylite II U-379<br>10% Polylite II U-382 | Alpha Chemical<br>Reichhold Chemical | 360 |
| 100% P-62018 | Alpha Chemical | 350 |
| 100% PPG-5148 | Pittsburgh Plate Glass | 285 |
| 100% IC-1850 | Interchemical | 300 |
| 100% IC-1892 | Interchemical | 160 |
| 100% Polylite 8400 w/DAP | Reichhold Chemical | 185 |
| IC-382 F | Interchemical | 145 |
| Stypol 40-2016 | H. H. Robertson | 360 |
| Stypol 40-2025 | H. H. Robertson | 235 |
| Vibrin 156R | Naugatuck Chemical | 295 |
| 90% Altek 4<br>10% Altek 3 | Alpha Chemical | 150 |
| 90% Altek 4<br>10% Polylite II U-379 | Alpha Chemical<br>Reichhold Chemical | 210 |
| 80% Altek 4<br>10% Altek 3<br>10% Polylite II U-382 | Alpha Chemical<br>Reichhold Chemical | 100 |

EXAMPLE II

The experimental work described in Example I was repeated, using a mineral oil containing about 3 percent of a colloidal dispersion of a reaction product of dimethyldioctadecylammonium halide and a magnesium montmorillonite widely sold under the name "Bentone 38" as the liquid heat-transfer agent. This heat-transfer medium had a specific gravity of about 0.85 at 200° F. and a viscosity of 44 centipoises. There were no other differences in procedure from that of Example I other than that the beads were washed with acetone rather than with water after the final curing. Tests of compressive loads at room temperature and at 200° F. on individual spheres having an average diameter of 0.1304 inch were made. The best results were given by the following polyester pre-plastic materials.

Table 2
COMPARISON OF PHYSICAL CHARACTERISTICS OF VARIOUS PLASTIC BEADS

| Polyester Pre-Plastic | Manufacturer | Compressive Load at Room Temperature (Pounds) |
|---|---|---|
| Vibrin 156R | Naugatuck Chemical | 295 |
| P-62018 | Alpha Chemical | 320 |
| PPG-5148 | Pittsburgh Plate Glass | 275 |
| IC-1850 | Interchemical | 320 |

| | | Compressive Load at 200° F. (Pounds) |
|---|---|---|
| IC-1850 | Interchemical | 195 |
| IC-1892 | Interchemical | 315 |
| Polylite 8440 w/DAP | Reichhold Chemical | 185 |
| IC-382F | Interchemical | 170 |

EXAMPLE III

In order to compare the strength of polyester spheres prepared in the two types of liquid heat-transfer media, the following tests were run. The procedure was the same as in Example I except that the mixture or polyester pre-plastic was cured in the ethylene glycol-glycerol mixture described above, and the same experiment was repeated using the same material cured in the mineral oil containing about 3 percent of the reaction product of dimethyldioctadecyl ammonium halide with a magnesium montmorillonite, widely sold under the name "Bentone 38." The following results were obtained:

Table 3
COMPARISON OF TWO CURING MEDIA

| Resin | 90% Altek 4 10% Altek 3 | 90% Altek 4 10% Polylite H U-379 | Polylite 8020 |
|---|---|---|---|
| Average Diameter of Bead (inches) | 0.091 | 0.091 | 0.1304 |
| Compressive Strength Ethylene Glycol (Room Temperature) | 160 | 100 | 120 |
| Compressive Strength Mineral Oil (Room Temperature) | 145 | 95 | 125 |

The differences in strength found were without significance.

From the foregoing it will be seen that this invention is one well adapted to attain all of the ends and objects hereinabove set forth, together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A process for producing spheres of thermoset polyester plastic comprising mixing a catalyst with a liquid polyester pre-plastic; extruding the resulting mixture in uniform spheroidal drops, each substantially equivalent in volume to a sphere having a diameter in the range from 0.09 to 0.25 inch; dropping the extruded drops freely downward through a gas into a substantially quiescent, hot liquid heat-transfer medium inert to the drops and immiscible therewith through a distance sufficient for the falling drops to acquire substantially spherical shape and insufficient for the drops to acquire sufficient velocity to break up the drops on contact with the hot liquid heat-transfer medium; maintaining the temperature of the liquid heat-transfer medium below the boiling point of the lowest boiling material in the drops and above the melting point of the highest melting material therein; passing the drops slowly downward by gravity through the heat-transfer medium for a time sufficient for initial cure of polyester plastic; and completing cure of the resulting spherical drops in a lower part of the heat-transfer medium.

2. A process for producing spheres of thermoset polyester plastic comprising mixing benzoyl peroxide with a liquid polyester pre-plastic; extruding the resulting mixture in uniform spheroidal drops at a plurality of laterally spaced locations, said drops having volume substantially equivalent to that of a sphere having a diameter in the range from 0.09 to 0.25 inch, and being extruded at a rate of about one drop per second at each location; dropping the extruded drops freely downward through a gas into a substantially quiescent, hot liquid heat-transfer medium inert toward the drops and immiscible therewith through a distance sufficient for the falling drops to acquire substantially spherical shape and insufficient for the drops to acquire sufficient velocity to break up the drops on contact with the hot liquid heat-transfer medium; maintaining the temperature of the liquid heat-transfer medium below the boiling point of the lowest boiling material in the drops and above the melting point of the highest melting material therein; passing the drops slowly downward by gravity through the heat-transfer medium in free-falling relationship therewith for a time sufficient for initial cure of polyester pre-plastic; and completing cure of the resulting spherical drops in a lower part of the heat-transfer medium.

3. A process for producing spheres of thermoset polyester plastic comprising mixing from 1 to 4 weight percent of benzoyl peroxide with a liquid polyester pre-plastic; extruding the resulting liquid mixture in uniform spheroidal drops substantially equivalent in volume to a sphere having a diameter in the range from 0.09 to 0.25 inch at each of a plurality of laterally spaced locations at a rate of about one drop per second at each location; dropping the extruded drops freely downward through air for a distance of about 1 to 4 feet into a hot liquid heat-transfer medium inert thereto and immiscible therewith, said heat-transfer medium having specific gravity and viscosity such that the drops fall freely therethrough at a rate of about 2½ to 10 seconds per linear foot of travel; maintaining the temperature of the liquid heat transfer medium in the range from about 200° F. to 300° F.; and completing cure of the spherical drops in a lower part of the heat-transfer medium.

4. A process for producing spheres of thermoset polyester plastic comprising thinning a viscous polyester pre-plastic with sufficient monomer to produce a free-flowing liquid; mixing from 1 to 4 percent of benzoyl peroxide with the liquid polyester pre-plastic; extruding the resulting liquid mixture in uniform spheroidal drops substantially equivalent in volume to a sphere having a diameter in the range from 0.09 to 0.25 inch at each of a plurality of laterally spaced locations at a rate of about one drop per second at each location; dropping the extruded drops freely downward through air for a distance of about 1 to 4 feet into a hot liquid heat-transfer medium inert thereto and immiscible therewith and having a specific gravity in the range from about 1.137 to 1.141; maintaining the temperature of the liquid heat-transfer medium in the range from 200° F. at the bottom of the body of liquid to not more than 300° F. at the top of the heat-transfer medium; passing the drops slowly downward by gravity through the heat-transfer medium in free-falling relationship therewith at a linear speed of about 2½ to 10 seconds per foot for a time in the range from about 20 to 40 seconds; completing cure of the spherical drops in a lower part of the heat-transfer medium; and separating the resulting spheres of thermoset polyester plastic from the heat-transfer medium.

5. The process of claim 4 wherein cure of the spherical drops in the lower part of the heat-transfer medium is continued for a time sufficient to provide a total curing time of about 5 to 10 minutes.

6. The process of claim 4 wherein the heat-transfer medium is a mixture of ethylene glycol and glycerol in proportions from 5:1 to 3:1.

7. The process of claim 4 in which benzoyl peroxide is used at about 2 percent of the weight of polyester pre-plastic.

8. The process of claim 4 wherein the heat gradient is from 200° F. at bottom to a temperature in the range from 225° F. to 300° F. at top.

9. The process of claim 4 wherein the heat transfer medium is maintained in a temperature gradient fom about 200° F. at the bottom thereof to 275° F. at the top.

10. The process of claim 4 wherein the heat gradient is from about 210° F. at the bottom to about 245° F. at the top.

11. A process for producing spheres of thermoset polyester plastic comprising thinning a viscous polyester pre-plastic with sufficient monomer to produce a free-flowing liquid; mixing from 1 to 4 percent of benzoyl peroxide with the liquid polyester pre-plastic; extruding the resulting liquid mixture in uniform spheroidal droplets substantially equivalent in volume to a sphere having a selected diameter in the range from 0.09 to 0.25 inch at each of a plurality of laterally spaced locations at a rate of about one drop per second at each location; dropping the extruded drops freely downward through air for a distance of about one to four feet into a hot liquid heat-transfer medium consisting essentially of a petroleum oil thickened with a reaction product of a long chain alkyl quaternary ammonium halide and a clay; maintaining the temperature of the liquid heat transfer medium in the range from 200° F. at the bottom of the body of liquid to not more than 300° F. at the top of said body of liquid heat-transfer medium; passing the drops slowly downward by gravity through the heat-transfer medium in free-falling relationship therewith at a linear speed of about 2½ to 10 seconds per foot for a time in the range from about 20 to 40 seconds; completing cure of the resulting spherical drops in a lower part of the body of liquid heat-transfer medium; and separating the resulting spheres of cured thermoset polyester plastic from the heat-transfer medium.

12. The process of claim 11 wherein the reaction product is the product of dimethyldioctadecylammonium halide reacted with magnesium montmorillonite.

References Cited by the Examiner
UNITED STATES PATENTS

| | | | |
|---|---|---|---|
| 2,087,019 | 7/37 | Clement | 264—13 |
| 2,652,386 | 9/53 | Wallman | 264—14 |

ALEXANDER H. BRODMERKEL, *Primary Examiner.*

ROBERT F. WHITE, *Examiner.*